B. H. & W. C. ADAMS.
SEED TESTING APPARATUS.
APPLICATION FILED APR. 6, 1911.

1,085,780.

Patented Feb. 3, 1914.
4 SHEETS—SHEET 4.

Witnesses:
John Enders
A. C. Thomas

Inventors:
Burton H. Adams &
by Walter C. Adams,
Wallace R. Lane Atty.

COLUMBIA PLANOGRAPH CO., WASHINGTON, D. C.

UNITED STATES PATENT OFFICE.

BURTON H. ADAMS AND WALTER C. ADAMS, OF DECORAH, IOWA.

SEED-TESTING APPARATUS.

1,085,780. Specification of Letters Patent. Patented Feb. 3, 1914.

Application filed April 6, 1911. Serial No. 619,237.

*To all whom it may concern:*

Be it known that we, BURTON H. ADAMS and WALTER C. ADAMS, citizens of the United States, and residing at Decorah, in the county of Winneshiek and State of Iowa, have invented a new and Improved Seed-Testing Apparatus, of which the following is a specification.

Our invention relates to apparatus for testing the germinating quality of seeds, and has for its object the provision of a seed tester embodying various characteristic features of novelty whereby the percentage of germinable seeds is quickly and accurately determined.

Broadly considered in one of its several aspects, our invention comprises a drawer provided with a water reservoir on one or more sides to hold the water which feeds a blotter or other absorbent material on which the seeds are placed.

In its preferred construction, our new form of drawer is made of sheet metal having depressed portions which form the reservoirs, the tops of the reservoirs being substantially on a level with the bottom of the drawer. To prevent spilling of the water in the reservoirs the latter are provided with spring-pressed covers which are held snugly against the blotter at the points where it enters the reservoirs.

Another object of the invention consists in the provision of means for holding the seeds in regular order on the absorbent material in the drawer so as to permit a quick and ready calculation of the percentage of germinable seeds. Broadly considered, this means comprises a blotter having recesses therein for the reception of seeds. These recesses may either be formed in the main blotter which dips into the reservoirs of the drawer, or they may be formed separately from the main blotter. This idea of separable recesses, as they may be properly termed, may be carried out in various ways. For instance, small blotter pads provided with recesses or indentations are designed to be placed upon the main blotter in the drawer being filled with the seeds to be tested. This filling may be done outside of the cabinet which supports the drawers. Or, small blotter pads may be formed into cups which contain the seeds and which are placed upon the main blotter in the drawer. Instead of being punched or indented in the blotter pads, the recesses may be formed by molding the blotter pad with ridges or partitions running at right angles to each other or otherwise to form receptacles for the seeds. As a further embodiment of the removable recesses for the main blotter in the drawer, may be mentioned a crate-like filler which is placed upon the main blotter for separating large seeds, as, for instance, beans, which are liable to roll when the drawer is being handled.

Another object of our invention consists in providing the front of each drawer with an inwardly turned lip at its lower edge to deflect the water of condensation toward the inside of the cabinet in which the drawers, are mounted, whereby the water is prevented from running down the front of the machine. This construction also does away with the necessity of rigid cross pieces in front of the cabinet between the drawers.

A further object of our invention consists in providing each drawer with retaining means arranged to engage the guide members on which the drawer slides back and forth in the cabinet, so that when the drawer is drawn out it will be held in a horizontal position. This dispenses with the necessity of an upper guide and allows the drawers to work smoothly without cramping or jerking.

A further object of our invention is to prevent over heating of the bottom drawer by the lamp or other source of heat placed under the cabinet, and to cause a uniform distribution of the heat throughout the entire cabinet from the bottom drawer to the top drawer.

A still further object of our invention consists in providing a damper arrangement for regulating the flow of air, or other heating medium in the heating pipes. A suitable damper arrangement may also be provided for controlling the circulation of fresh air over and under the drawers through the machine.

The above and other objects and advantages will become apparent from a detailed description of the accompanying drawings in which.

Figure 1:
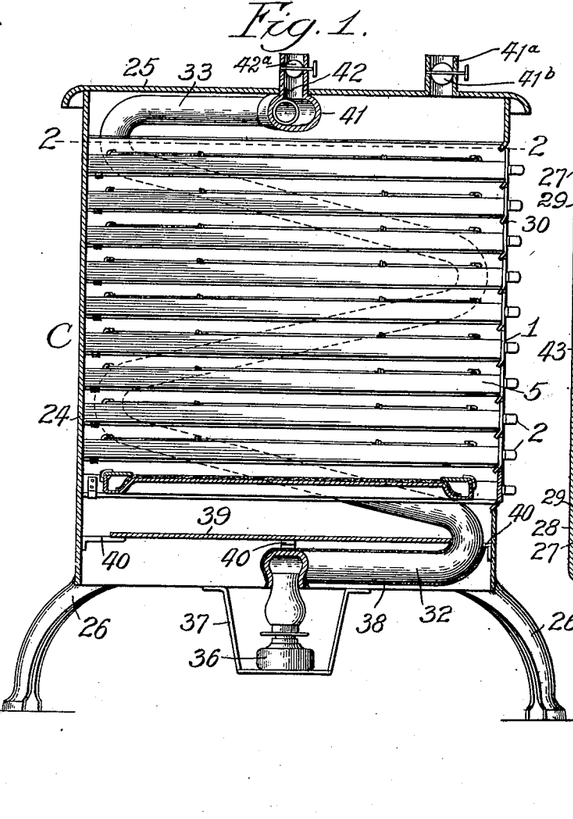
Figure 1 is a side view of a suitable form of seed testing cabinet provided with our new form of drawer, one side of the cabinet being removed to show the interior of the cabinet and certain parts being shown in cross-section for the sake of clearness.
Figure 2:
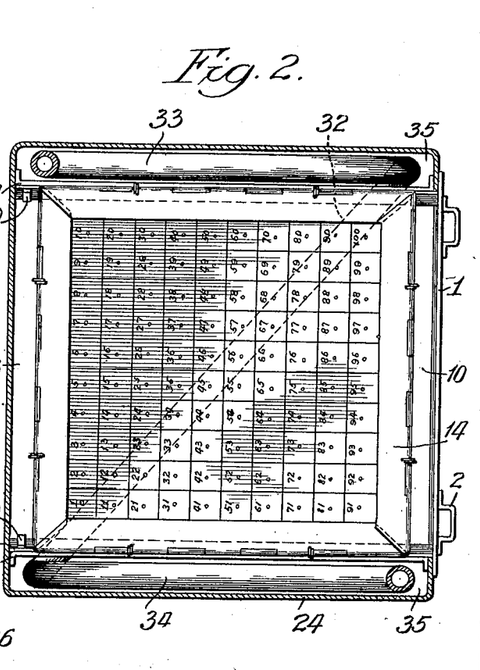
Fig. 2 is a top-plan view taken substantially on line 2—2 of Fig. 1, the legs of the cabinet being omitted.
Figure 3:
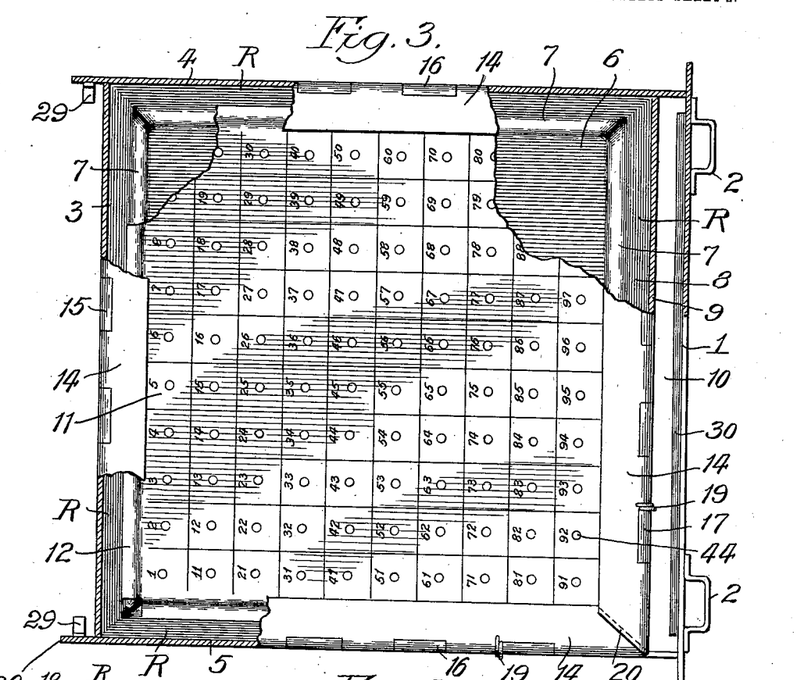
Fig. 3 is a top-plan view of a preferred embodiment of our new form of drawer, certain of the parts being broken away to expose the portions beneath.
Figures 4, 5, 6, 7:
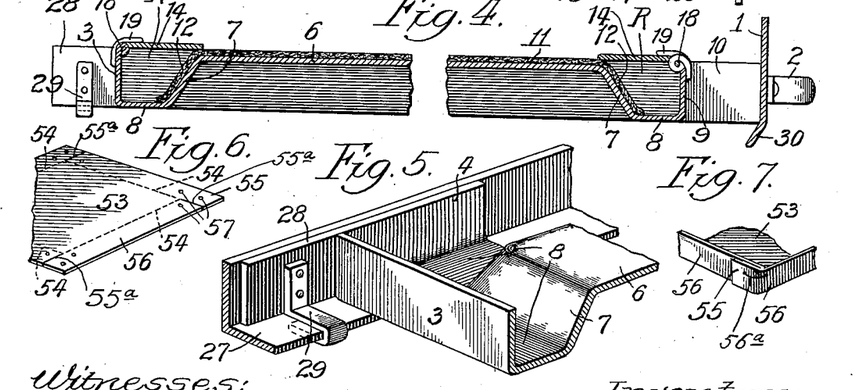
Fig. 4 is a longitudinal cross-sectional view on a larger scale of the drawer shown in Fig. 3, the central portion of the drawer being broken away to bring the figure within the limits of the sheet.
Fig. 5 is a detailed view in perspective of a rear corner of the drawer shown in Figs. 3 and 4.
Fig. 6 is a perspective view of a portion of a blotter pad used in forming a blotter cup.
Fig. 7 is a fragmentary view of a blotter cup formed from the blank or pad shown in Fig. 6.

Before taking up the description of the seed testing cabinet and the arrangement of the drawers therein, as shown in Figs. 1 and 2, we shall first describe in detail the construction of our new form of drawer as shown in Figs. 3, 4, 5, 8 and 9. Referring to Figs. 3, 4, and 5 which illustrate a preferred construction of drawer, it will be seen that the drawer comprises the front 1 which is provided with the handles 2, the back or rear piece 3, the sides 4 and 5 and the bottom 6—all these parts being of sheet metal in the particular embodiment illustrated. The bottom 6 is displaced downwardly at 7 on all four sides and then extended outwardly at 8. From the rear and side extensions 8 the metal is bent upwardly at right angles to form the rear and side pieces, respectively. This is best shown in the perspective view in Fig. 5. From the front extension 8, the metal is bent upwardly at 9. It will be apparent that there is thus formed a reservoir on all four sides of the drawer. The extensions 8 form the bottom of the reservoirs, the downwardly depressed portions 7 form the inner walls of the reservoirs, while the rear and side pieces of the drawer constitute the outer walls of the rear and side reservoirs, respectively. The outer wall of the front reservoir is formed by the partition 9, which is separated from the front piece 1 of the drawer by the space 10. The purpose of this space is to permit the circulation of air through the cabinet in which the drawers are placed, as will hereinafter more fully appear. For the sake of convenience I have indicated the reservoirs as a whole by the letter R. In the construction shown in Fig. 4, the reservoirs are in unrestricted communication with each other and, in effect, form one continuous reservoir. The reservoirs R are for the purpose of holding the water which supplies moisture to the absorbent material placed upon the bottom of the drawer, during the process of testing seeds for germination. In Figs. 3 and 4 the absorbent material 11 is in the form of a blotter pad, provided with integral tongue portions 12 which extend into the water-filled reservoirs, as best shown in Fig. 4. In testing, the seeds are placed upon the blotter or other absorbent material, the necessary moisture being supplied to the blotter from the reservoirs in the drawer. As seen in Fig. 3, the tongues or tongue portions 12 of the blotter extend substantially throughout the entire length of the reservoirs, thus insuring an even supply of moisture—a very desirable condition in the process of testing.

Figure 8:
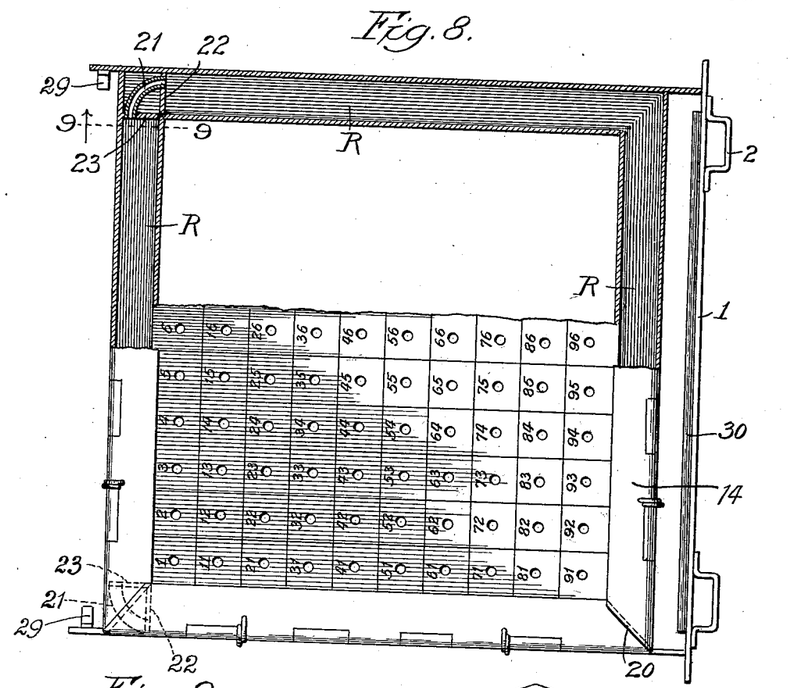
Fig. 8 is a top-plan view of a slightly modified form of drawer, certain of the parts being broken away for the sake of clearness.
Figures 9, 10, 11:
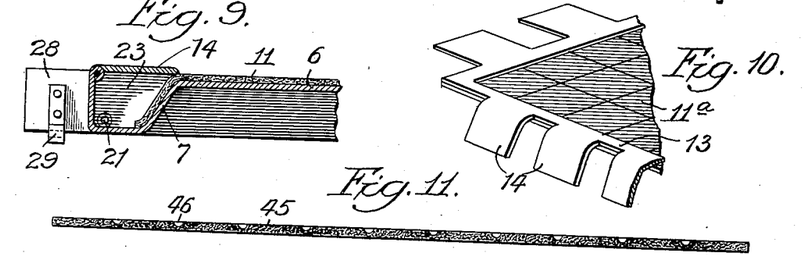
Fig. 9 is a fragmentary cross-sectional view on an enlarged scale taken substantially on line 9—9 of Fig. 8.
Fig. 10 is a fragmentary perspective view of a blotter provided with separate tongue portions, consisting of wicking or similar material.
Fig. 11 is a cross-sectional view of our new form of blotter pad provided with recesses in the form of indentations.

Instead of providing the blotter with integral tongues 12, we may use a blotter having wicking or like material secured around the edges. Thus, in Fig. 10, the blotter 11ª is provided with wicking 13 having tongues 14 which extend into the reservoirs. To prevent spilling of the water in the reservoirs during the handling of the drawer (as when it is withdrawn from and inserted into the testing cabinet), the reservoirs R are provided with tops or covers 14. The cover of the rear reservoir is hinged or pivoted at 15 to the rear piece 3 of the drawer. The covers for the side reservoirs are hinged at 16 to the sides 4 and 5, while the cover for the front reservoir is hinged at 17 to the partition 9. The hinge or pivot connections between the reservoir covers and the body of the drawer are most conveniently established by means of rods 18, as shown in the cross-sectional view in Fig. 4. Suitable springs 19 hold the covers yieldingly but firmly against the blotter at the point where it enters the reservoirs. In this way the reservoirs are rendered practically watertight, without, however, interfering with the proper operation of the blotter in drawing the requisite amount of moisture from the reservoirs. The covers are beveled at the ends and the adjacent ends overlap slightly, as indicated at 20 in Figs. 3, 8 and 13. Preferably the front cover overlaps the side covers (see Fig. 13), so that it may be raised for filling all four reservoirs from the front without the necessity of disturbing the covers of the side reservoirs. As clearly seen from Fig. 4, the top of the reservoirs is substantially on a level with the bottom 6. In the particular form illustrated in the drawings the drawer has a solid bottom. However, if desired, the metal of the bottom may be perforated. In its preferred construction the drawer is provided with reservoirs on all four sides. It is to be understood that this is not absolutely necessary and that a drawer having a smaller number of reservoirs is within the scope of our invention as defined in certain of the appended claims. Nor is it necessary that the communication between the reservoirs be unrestricted, as shown in Fig. 3. For instance, in the modification shown in Figs. 8 and 9, the side and rear reservoirs are connected by pipes 21. Partitions 22 and 23 separate the side and rear reservoirs. It is in these partitions that the pipes 21 are secured. As shown in Fig. 9, the pipes 21 are preferably secured near the bottom of the partitions so that the water may distribute itself evenly among the reservoirs even when at a low level. If desired the front reservoir of the drawer shown in Fig. 8 may have a pipe connection with the side reservoir, similar to the pipe connection between the rear and side reservoirs. Since the drawer shown in Fig. 8 is in all other respects substantially identical with the drawer shown in Fig. 3, the detailed description in Fig. 3 above given applies to Fig. 8, and no further description of Fig. 8 is, therefore, deemed necessary.

Having described in detail a preferred and modified form of our new seed testing drawer, we shall now describe the arrangement of the drawers in the cabinet illustrated in Figs. 1 and 2. In its preferred embodiment the cabinet is made of galvanized steel or iron. In Figs. 1 and 2 the cabinet is, as a whole, indicated by the reference letter C and comprises a body portion 24, a top or cover 25 and supporting legs 26, two of which are shown in Fig. 1. The specific form of cabinet shown in Figs. 1 and 2 accommodates 10 drawers. To support the drawers within the cabinet we provide a pair of guides 27 for each drawer. For the sake of illustration we have shown these guides as consisting of angle irons, but it is evident that they may be of any suitable form. Each pair of guides is so arranged within the cabinet that the sides of the drawer rest upon the guides in a manner to permit the drawer to be moved freely into and out of the cabinet. Each drawer is provided with means for holding it in horizontal position when withdrawn. Referring to Fig. 5 it will be seen that each side of the drawer is provided with a rear extension 28 to which is secured a hook 29. These hooks are so shaped as to interlock with the guide bars in a manner to hold the drawer in horizontal position when it is withdrawn from the cabinet. The shape and location of the retaining hooks 29 will vary with the particular form of guide bars. The retaining hooks 29 shown in the drawings are shaped to operatively engage with the horizontal flange of the L-shaped guide bars 27 which, as already stated, have been shown merely for the sake of illustration. The retaining hooks obviate the necessity of an upper guide for the drawer. Also by this construction there is no cramping or jerking of the drawers when they are opened or closed. By referring to Figs. 1 and 4, it will be seen that the front of each drawer has at its lower edge an inwardly turned lip 30. The object and purpose of this lip is best understood from Fig. 1 in which it is seen that the lip of an upper drawer laps inside of the drawer below in order to deflect the water of condensation into the lower drawer. In operating the testing cabinet under heat (as it is usually done), a condensation of moisture takes place within the cabinet. It has been found that with the form of drawers heretofore used, the condensed moisture ran down the front of the machine and wetted the floor—which rendered the machine objectionable for use in the house where cleanliness is desired. In our new form of drawer the condensed moisture which accumulates on the front of the drawers is deflected by the lips toward the inside of the cabinet where it may be caught in a suitable receptacle placed below the cabinet. The deflecting lips also prevent the condensed moisture from seeping out between the joints of the drawers at the front of the cabinet. The slight projection of the lip of an upper drawer into the drawer below does not interfere with the independent removal of the drawers, because the inclined lips allow a slight upward movement of the drawers when they are withdrawn from the cabinet.

The cabinet is heated by means of the following arrangement: A pipe 32 extends across the lower portion of the cabinet. One end of the pipe 32 connects with an upwardly extending pipe 33, while the other end of the diagonal pipe 32 connects with an upwardly extending pipe 34. The pipes 33 and 34 extend upwardly in zigzag fashion upon opposite sides of the cabinet, whereby a larger heating area is secured, together with an even distribution of heat. The zigzag pipes 33 and 34 are arranged in the spaces 35 formed between the side walls of the cabinet and the guide members 27. For the sake of illustration we have shown the source of heat for the pipes in the form of a lamp 36 which is supported on a bracket 37 secured to the lower end of the cabinet. The lamp may be supported at the side of the cabinet, if desired, also, the lamp may be replaced by other sources of heat, as for instance, an electric bulb. The heating medium circulating through the pipes may be air or water. The diagonal pipe 32 is provided with a covering 38 of suitable heat-insulating material such as, for instance, asbestos, to prevent dissipation of the heat by radiation in a direction away from the drawers, and also to prevent undue heating of the bottom drawer. As additional means for keeping the heat of the pipe 32 from the bottom of the lower-most drawer, a metallic heat guard 39 is arranged between the lower-most drawer and the pipe 32. This guard, which may be of any suitable form, is of smaller dimensions than the interior of the cabinet so as to allow a circulation of air through the cabinet. Lugs 40, or other suitable devices, are secured to the cabinet for holding the heat guard 39 in place. The zigzag pipes 33 and 34 terminate in the outlet member 41 which has a discharge opening 42 for the heated air within the pipes. By allowing a loose connection between the pipes 33 and 34 and the outlet member 41, the latter may also serve as an escape for the air circulating within the cabinet. If desired, however, a separate air outlet 41ª may be provided in the top of the cabinet. By reference to Fig. 2 it will be noticed that there is a space 43 at the rear of the drawers. The space 10 at the front of the drawers has already been referred to. These vertical spaces 10 and 43 allow fresh air to circulate properly within the cabinet over each drawer, thereby assisting the process of germination.

When a lamp is used for the source of heat, as illustrated in Fig. 1, the flow of heated air through the pipes can be regulated by the height of the flame. However, we have provided separate means for effecting this regulation of the heated air, and this means is particularly useful where the source of heat is of a kind which cannot be as readily regulated as a lamp—as for instance, an electric bulb. The heat-regulating means comprises an adjustable damper conveniently located in the pipe connections, so as to be readily operated to increase or decrease the flow of the heated medium through the pipes. In the specific embodiment shown in Fig. 1, the outlet 41 for the heating pipes is in its outer portion provided with a damper 42ª which may be readily moved by hand to any adjusted position. If desired, the damper may be arranged at a different point from that shown in Fig. 1. However, for the sake of simplicity and convenience we prefer to arrange the damper in the outlet of the heating pipes. A suitable damper arrangement may also be provided for regulating the circulation of air through the machine—that is to say, the air that circulates over and under each drawer and at the top of the cabinet. The outlet 41ª in Fig. 1 is provided with the damper 41ᵇ which is readily adjustable by hand to increase or decrease the circulation of air through the cabinet.

Since the operation of testing seeds by placing them upon blotters or other absorbent material saturated with moisture and subjecting the seeds to the proper degree of heat until the germinable seeds have sprouted, is well understood by those skilled in the art, no further description of the operation or manner of using our seed testing apparatus is thought necessary.

In order to facilitate the determination of the percentage of germinable seeds and to promote accuracy in such determination, we have provided means for properly distributing the seeds in the drawers and preventing them from rolling about in the drawers. In Figs. 3 and 8, the blotter upon which the seeds are placed is provided with recesses 44 for receiving the seeds. These recesses are arranged in suitably charactered spaces. There may be, for instance, one hundred of these spaces, as shown in Figs. 3 and 8. For convenience, the spaces have been numbered from 1 to 100, although other methods of designation may be used. By thus arranging the seeds in sets of one hundred each, or otherwise, the percentage of germinable seeds is at once determined.

In Fig. 11 we have shown, on an enlarged scale, a small blotter pad 45 having indentations 46 punched therein. The cross-sectional view of this figure shows a row of ten indentations. For convenience, each blotter pad may have ten rows of ten indentations each, or one hundred indentations in all. These blotter pads are designed to be filled outside of the machine and to be laid on a plain blotter in the drawer, similar to the blotter shown in Figs. 3 and 4 without the recesses 44. The indented blotter is particularly adapted for the testing of very small seeds. A seed is placed in each of the one hundred indentations on a blotter pad, and the blotter pads thus filled are then laid on the large blotter in the drawer. The moisture of the large or bottom blotter is sucked up, as it were, by the small blotter pads so that the seeds are supplied with the proper amount of moisture.

Figure 12:
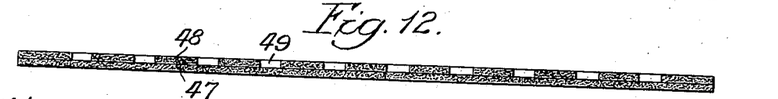
Fig. 12 is a cross-sectional view of a double blotter pad in which the recesses are formed by holes punched through the upper blotter.

Fig. 12 shows a blotter pad designed for larger seeds, the drawing showing the pad on an enlarged scale for the sake of clearness. The blotter pad of this figure is a double blotter comprising the solid lower blotter 47 and the upper blotter 48 provided with holes 49 of sufficient size to accommodate larger-sized seeds. The double blotter pads, like the indented blotter pads just described, are adapted to be filled outside of the machine and then laid on the regular blotter in the drawer. The double blotter pads have the perforations arranged at regular intervals. Both of these blotter pads are made in units of one hundred or more depressions, the number being indicated on each blotter. When tests are made one seed is placed in each depression or indentation, thus doing away with the drudgery of counting the seeds. Since the seeds are held apart at regular intervals the percentage of germination is quickly and easily ascertained, making any extended calculation unnecessary.

Figure 15:
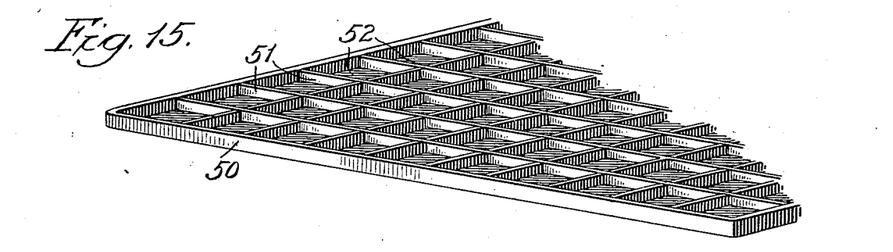
Fig. 15 is a perspective view, partly broken away, of a blotter molded with ridges or partitions.
Figure 16:
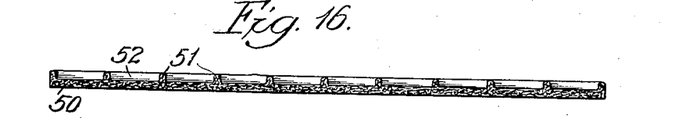
Fig. 16 is a cross-sectional view of the molded blotter shown in Fig. 15.

Figs. 15 and 16 show a molded blotter pad 50 formed with ridges or partitions 51 running at right angles to each other, or otherwise, so as to form chambers or recesses 52 for the seeds.

Figs. 6 and 7 show a blotter pad 53 in the form of a cup. Fig. 6 shows the sheet or blank from which the cup is formed, while Fig. 7 shows a portion of the formed blotter cup. To form the cup, the blotter sheet or blank, as it may be termed, is bent upwardly along the dotted lines 54, as indicated in Fig. 6. The extensions, or tongues 55 which are formed at the corners by slotting the blank along lines 55ª are then bent laterally to overlap the adjacent sides 56, as shown in Fig. 7. A thread, pin or wire 56ª is then passed through the openings 57, or any other method may be used, for securing the upturned sides 56 firmly together. The blotter cups formed in this simple and inexpensive way are used like the indented, punched and molded blotter pads already referred to. The molded blotter pads and the blotter cups are particularly valuable in testing beans and other large seeds which would be very easily disturbed on a flat-bottom blotter and jumbled together upon the manipulation of the drawer. This would make an arduous task of the testing. However, by placing the beans or other large seeds in the molded blotter or the blotter cups, rolling of the seeds is absolutely prevented and the percentage of germinable seeds readily determined.

Figure 13:
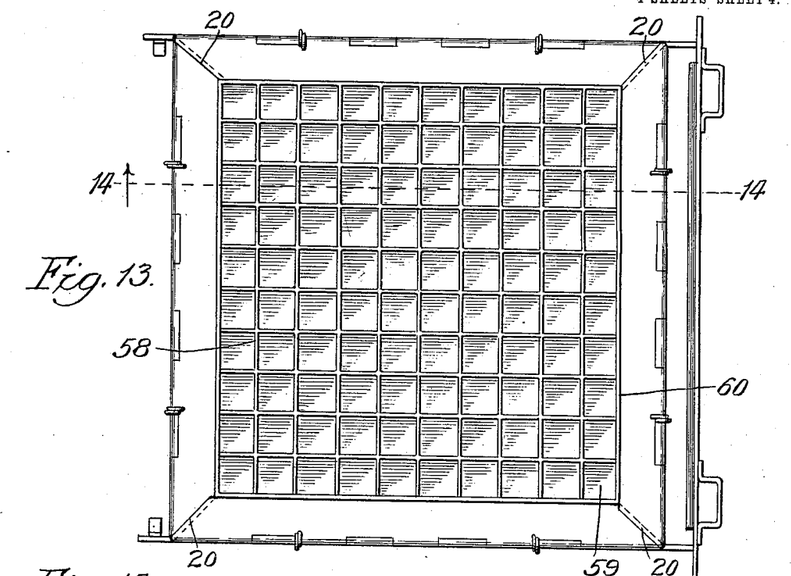
Fig. 13 is a top-plan view of our new form of drawer provided with a crate-like filler resting on the blotter.
Figure 14:
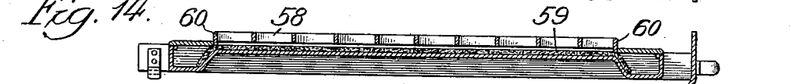
Fig. 14 is a cross-sectional view taken substantially on line 14—14 of Fig. 13.

Figs. 13 and 14 show a drawer provided with a crate-like filler 58 to receive beans or other seeds liable to roll when the drawers are closed and opened. This filler rests directly upon the blotter 59. The edges 60 of the filler may be made slightly wider than the partitions so that the filler will rest on the blotter only at the outer edges. This positively prevents any interference by the filler with the circulation of water through the blotter. However, the filler may be constructed to rest entirely upon the blotter without seriously interfering with the testing operation. The filler may be made of any suitable material. Preferably, however, it is constructed of sheet metal such as iron or aluminum.

While we have herein described and illustrated a specific form of apparatus embodying the various features of novelty which characterize our invention, it is to be understood that we do not intend to be limited to the specific constructions shown in the drawings.

It is obvious that changes and modifications may be made by those skilled in the art without departing from the scope of the invention as defined in the appended claims. It is furthermore obvious that certain features of our invention may be used without certain other features.

Having thus described our invention what we claim as new and desire to secure by Letters Patent of the United States is:

1. In a seed testing apparatus, a cabinet provided with a plurality of removable drawers, upwardly extending heating pipes arranged within said cabinet, a source of heat for said pipes, and a metallic plate supported on said cabinet between the lower-most drawer and said source of heat to protect said drawer against undue heating.

2. In a seed testing apparatus, a cabinet provided with a plurality of removable drawers, upwardly extending heating pipes arranged within said cabinet, a support secured to the bottom of said cabinet, a lamp carried by said support, a plurality of lugs extending inwardly from said cabinet between the lower-most drawer and said lamp, and a metallic plate carried by said lugs to protect said drawer against undue heating.

3. In a seed testing apparatus, a cabinet provided with a plurality of removable drawers, a heating pipe arranged diagonally in the lower portion of said cabinet, pipe extensions leading upwardly from the ends of said diagonal pipe, a lamp connected with said pipe for heating the same and the extensions thereof, a support for said lamp, and a metallic plate supported between the lower-most drawer and said diagonal pipe to prevent the heat of said pipe from directly radiating against the bottom of the lower-most drawer.

4. In a seed testing apparatus, a cabinet provided with a plurality of removable drawers, a heating pipe arranged diagonally in the lower portion of said cabinet, pipe extensions leading upwardly from the ends of said diagonal pipe, a lamp connected with said pipe for heating the same and the extensions thereof, a support for said lamp, a metallic plate supported by said cabinet between the lower-most drawer and said diagonal pipe to prevent the heat of said pipe from directly radiating against the bottom of the lower-most drawer, and a heat-insulating cover for said diagonal pipe.

5. In a seed testing apparatus, a series of drawer fronts arranged one above another and each having its lower edge bent inward to deflect the water of condensation toward the inside of the cabinet, each lower edge overlapping the top of the next lower drawer front.

6. In a seed testing apparatus, a cabinet provided with a plurality of drawers, the front of each drawer having at its lower edge an inwardly turned lip which laps inside of the drawer front below to deflect the water of condensation toward the inside of the cabinet.

7. In a seed testing apparatus, a cabinet provided with a plurality of sheet metal drawers, the front of each drawer having at its lower edge an inwardly turned lip which laps inside of the drawer front below to deflect the water of condensation toward the inside of the cabinet, said drawers being so arranged that each may be withdrawn independently of the others by slightly raising it to disengage the lip thereof from the drawer below.

8. In a seed testing apparatus, a cabinet provided with a plurality of drawers, an air passage through each drawer near the front, the front of each drawer having at its lower edge an inwardly turned lip which deflects the water of condensation toward the inside of the cabinet, said drawers being so arranged that each may be withdrawn independently of the others.

9. In a seed testing apparatus, a drawer provided with a reservoir adapted to hold water, and a pivoted cover for said reservoir.

10. In a seed testing apparatus, a drawer provided with a reservoir adapted to hold water, and a pivoted spring-pressed cover for said reservoir.

11. In a seed testing apparatus, a sheet metal drawer for holding seeds under test, said drawer having a depressed portion forming a reservoir for holding water to moisten said seeds.

12. In a seed testing apparatus, a sheet metal drawer having a depressed portion to form a reservoir for holding water, and a pivoted spring-pressed cover for said reservoir.

13. In a seed testing apparatus, a cabinet, a drawer slidingly mounted in said cabinet and removable therefrom for holding said seeds, said drawer being provided with a narrow integral reservoir adapted to hold water for moistening said seeds.

14. In a seed testing apparatus, a drawer provided with four reservoirs, one on each side, said reservoirs communicating with each other, and absorbent material dipping in said reservoirs and fed with moisture therefrom.

15. In a seed testing apparatus, a drawer provided with four reservoirs, one on each side, the front reservoir being spaced from the front of the drawer to permit the circulation of air.

16. In a seed testing apparatus, a sheet metal drawer in which the sides of the bottom are depressed to form reservoirs for holding water.

17. In a seed testing apparatus, a sheet metal drawer in which the sides of the bottom are depressed to form reservoirs for holding water, and a pivoted spring-pressed cover for each reservoir.

18. In a seed testing apparatus, a sheet metal drawer in which the four sides of the bottom are depressed to form reservoirs for holding water, said reservoirs communicating with each other, and a spring-pressed cover for each reservoir, the front cover lapping the side covers so that it may be raised for filling all four reservoirs from the front without disturbing the covers of the other reservoirs.

19. In a seed testing apparatus, the combination of a cabinet, means for heating said cabinet, a seed drawer within said cabinet and provided with a reservoir for holding water, and a sheet of absorbent material having a tongue extending into said reservoir for moistening seeds under test in said drawer.

20. In a seed testing apparatus, the combination of a drawer provided with a reservoir for holding water, a sheet of absorbent material having a tongue extending into said reservoir, and a spring-pressed cover for said reservoir adapted to be held snugly against the absorbent material at the point where it enters the reservoir.

21. In a seed testing apparatus, the combination of a seed drawer provided with a plurality of reservoirs, means for heating said drawers to germinate seeds carried therein and a sheet of absorbent material having tongues extending into said reservoirs to carry moisture to said germinating seeds.

22. In a seed testing apparatus, a drawer provided with a reservoir adapted to hold water, the top of said reservoir being substantially on a level with the bottom of the drawer and a sheet of absorbent material covering the bottom of said drawer and dipping in the water held by said reservoir.

23. In a seed testing apparatus, the combination of a drawer provided with four reservoirs, one on each side, a sheet of absorbent material having tongues extending into said reservoirs, and a spring-pressed cover for each reservoir adapted to be held snugly against the absorbent material at the point where it enters the reservoir.

24. In a seed testing apparatus, a sheet metal drawer having a raised bottom for receiving absorbent material and depressed side portions surrounding said bottom and forming a continuous reservoir adapted to hold water.

25. In a seed testing apparatus, a cabinet provided with a plurality of drawers adapted each to receive absorbent material, each drawer being provided with a source of water supply at an edge thereof in which an edge of the absorbent material dips.

26. In a seed testing apparatus, a seed drawer having a sheet of absorbent material resting on the bottom thereof, means for heating said drawer, and means for supplying moisture to said material evenly from all four sides toward the center.

27. In a seed testing apparatus, the combination of a drawer provided with a plurality of integral reservoirs, and a sheet of absorbent material having tongues extending into said reservoirs.

28. In a seed testing apparatus, a drawer provided with water reservoirs on all four sides, and a blotter having tongues extending into said reservoirs.

29. As a new article of manufacture, a blotter pad having inclosed recesses formed therein at regular intervals for receiving seeds.

30. As a new article of manufacture, a blotter pad provided with raised ridges or partitions intersecting to form recesses for receiving seeds.

31. In a seed testing apparatus, a metal drawer having a sheet of absorbent material contacting directly therewith, said material having recesses for receiving seeds.

32. In a seed testing apparatus, a metal drawer having inert absorbent material contacting directly therewith and partitions on said material to form recesses for receiving and retaining seeds.

33. In a seed testing apparatus, a metal drawer having a sheet of inert absorbent material contacting directly therewith, and removable partitions on said sheet, said partitions serving to prevent seeds from rolling about on said absorbent material.

34. In a seed testing apparatus, a metal drawer having a sheet of inert absorbent material therein, and metallic partitions above said sheet, said partitions forming recesses for receiving seeds.

35. In a seed testing apparatus, the combination of a drawer provided with a plurality of reservoirs, and a sheet of absorbent material having tongues extending into said reservoirs, said sheet being provided with recesses arranged at regular intervals for receiving seeds.

36. In a seed testing apparatus, the combination of a drawer provided with a plurality of reservoirs and a sheet of absorbent material having tongues extending into said reservoirs, said sheet being provided with a removable part forming recesses arranged at regular intervals for receiving seeds.

37. In a seed testing apparatus, a metal drawer having a bottom free from perforations and adapted to rigidly support a suitable absorbent material, and means in said drawer for slowly supplying moisture to said material.

38. In a seed testing apparatus, a cabinet provided with a plurality of metal drawers, upwardly extending heating pipes arranged within said cabinet, a source of heat for said pipes, an outlet for said pipes in the top of the cabinet, an adjustable damper in said outlet for controlling the flow of heated air from said source through said pipes, an outlet in the top of said cabinet permitting the circulation of air on the outside of said pipes, and an adjustable damper in said outlet for regulating the volume of circulating medium which passes on the outside of said pipes.

In witness whereof we hereunto subscribe our names, this 12 day of January, 1911.

BURTON H. ADAMS.
WALTER C. ADAMS.

Witnesses:
WILLIAM R. SHEA,
EMMA R. ULEN.

---

Copies of this patent may be obtained for five cents each, by addressing the "Commissioner of Patents, Washington, D. C."